United States Patent [19]

Domenico et al.

[11] Patent Number: 5,364,662
[45] Date of Patent: Nov. 15, 1994

[54] SURFACE TREATMENT OF SILICONE RUBBER

[75] Inventors: Edward D. Domenico, Anoka; Mark T. Stewart, Brooklyn Center, both of Minn.; Marek W. Urban, Fargo, N. Dak.

[73] Assignees: Medtronic, Inc.; North Dakota State University, Minneapolis, Minn.

[21] Appl. No.: 929,937

[22] Filed: Aug. 14, 1992

[51] Int. Cl.⁵ .................................................. B05D 3/06
[52] U.S. Cl. ...................................... 427/536; 427/296; 427/322; 427/444; 427/553; 427/575
[58] Field of Search .............. 427/536, 575, 296, 322, 427/444, 553

[56] References Cited

U.S. PATENT DOCUMENTS

| | | | |
|---|---|---|---|
| 3,632,386 | 1/1972 | Hurst | 161/208 |
| 3,677,877 | 7/1972 | Metevia | 161/164 |
| 3,955,012 | 5/1976 | Okamura | 427/2 |
| 3,959,105 | 5/1976 | Feneberg | 204/164 |
| 4,214,014 | 7/1980 | Hofer | 427/40 |
| 4,217,038 | 8/1980 | Letter | 351/160 R |
| 4,311,828 | 1/1982 | Imada | 528/483 |
| 4,312,693 | 1/1982 | Salensky | 156/272 |
| 4,344,981 | 8/1982 | Imada | 204/165 |
| 4,492,733 | 1/1985 | Phillips | 428/412 |
| 4,508,606 | 4/1985 | Andrade | 204/169 |
| 4,613,517 | 9/1986 | Williams | 427/2 |
| 4,673,584 | 6/1987 | Nygren | 427/2 |
| 4,686,135 | 8/1987 | Obayashi | 428/265 |
| 4,714,650 | 12/1987 | Obayashi | 428/265 |
| 4,804,431 | 2/1989 | Ribner | 156/345 |
| 4,822,632 | 4/1989 | Williams | 219/121.36 |
| 4,997,606 | 3/1991 | Mears | 264/102 |
| 5,004,625 | 2/1991 | Goldburt | 427/96 |
| 5,080,924 | 1/1992 | Kamel | 427/2 |
| 5,132,108 | 7/1992 | Narayanan | 424/78.17 |

OTHER PUBLICATIONS

"Spectroscopic evidence for Si–H formaiton during microwave plasma modification of polydimethylsiloxane) elastomer surfaces", by Gaboury et al in Polymer Communications, 1991, vol. 32, No. 13 (no month available).

*Primary Examiner*—Bernard Pianalto
*Attorney, Agent, or Firm*—Daniel W. Latham; Harold R. Patton

[57] ABSTRACT

Silicone hydride (Si—H) can be produced on the surface of silicone rubbers by plasma treatment of silicone rubber in the presence of hydrogen or an inert gas such as nitrogen, helium, neon or argon in a plasma chamber which is substantially free of oxygen and oxygen-producing compounds. The silicone hydride can then be used as a grafting site for the covalent attachment for many substances, including bioactive molecules.

20 Claims, 9 Drawing Sheets

SURFACE TREATMENT OF SILICONE RUBBER

BACKGROUND OF THE INVENTION

This invention relates to the surface treatment of polymeric materials for the purpose of bonding or grafting chemical substances to the surface thereof. It relates particularly to silicone rubbers and to bonding to silicone rubbers substances having a desired biological activity or compatibility when implanted in the human body.

Many different techniques have been used to modify material surfaces in order to improve their resistance to thrombosis, infection and inflammation. Techniques for surface modification can include physicochemical methods such as the physical deposition of a coating on the material surface, chemical modification of the material surface, graft polymerization onto the material surface and plasma gas discharge. For example, in U.S. Pat. No. 4,613,517 issued to Williams et al., a method for heparin attachment to a polymeric surface is disclosed. The polymeric surface is activated by a plasma, steeped in a cationic surface active agent and reacted with heparin. Also, for example, in U.S. Pat. No. 5,080,924 issued to Kamel et al., biocompatible, surface modified material is produced by covalently grafting a biocompatible material having pendant carboxyl or amine groups to a substrate material in the presence of a radio frequency plasma. Or, for example, in U.S. Pat. No. 3,955,012 issued to Okamura et al., silicone rubber articles are subjected to a spark discharge, coated with collagen and subjected to ionizing radiation in a moist atmosphere to produce a surface of improved biocompatibility. Since silicone rubbers have a well established history of use in medical implants such as in heart pacemaker leads, implantable prosthetic devices and the like, it would be especially desirable to be able to provide surface modifications to silicone rubber that would extend and enhance its usefulness in various implantable devices. However, silicone rubber ha& heretofore proved to be a difficult surface to bond to, producing poor yields of biomaterial adhered to the surface.

It is therefore an object of the present invention to provide a modified silicone rubber surface to which a wide variety of materials may be readily be bonded.

It is also an object of the present invention to provide a modified silicone rubber surface to which materials may be bonded with a high yield of material on the surface.

SUMMARY OF THE INVENTION

These and other objects have been accomplished by the present invention. We have discovered that significant amounts of functional silicone hydride (Si—H) can be produced on the surface of silicone rubbers by plasma treatment of silicone rubber in the presence of hydrogen or an inert gas such as nitrogen, helium, neon or argon in a plasma chamber which is substantially free of oxygen and oxygen-producing compounds. The silicone hydride can then be used as a grafting site for the covalent attachment for many substances, including bioactive molecules.

DETAILED DESCRIPTION OF THE INVENTION

Functional silicone hydride (Si—H) can be produced on the surface of silicone rubbers by plasma treatment of silicone rubber in the presence of hydrogen or an inert gas such as nitrogen, helium, neon or argon in a plasma chamber which is substantially free of oxygen or oxygen-producing compounds. The silicone hydride can then be used as a grafting site for the covalent attachment for many substances, including bioactive molecules.

Silicone rubber herein means materials comprising polydimethylsiloxane (PDMS). The silicone rubber can also include silicas, fillers, additives to inhibit stiffening, catalysts, plasticizers and the like. Medical grades of silicone rubber such as those used for heart pacemaker leads, implantable prosthetic devices and the like are preferred.

The silicone rubber is plasma treated. The frequency at which the plasma is generated has not been found to be critical. Plasma treatment can be provided by radio frequency gas plasma at the standard frequency of about 13.56 MHz or plasma reactors operating at other frequencies such as microwave frequencies. However, it is believed to be important to provide atmospheric conditions in the plasma reactor which limit gas flow rates (if an inert gas is used) and which exclude oxygen and compounds capable of producing oxygen in the presence of the plasma. Therefore, reactors which allow significant air leakage or use high gas flow rates would not be suitable for the present invention. Although we do not wish to be bound by theories, we believe that since the bond energies of silicon-carbon and carbon-hydrogen bonds are lower than the bond energies for silicon-oxygen and silicon-hydrogen bonds, the Si—C and C—H bonds are preferentially cleaved by the excited gas/plasma particles, resulting in reactive silicon sites on the surface polymer backbone as well as highly reactive carbon and hydrogen fragments in the gas phase. The reactive silicon is then able to recombine with the reactive hydrogen species to form the more stable, higher energy Si—H bond. This reaction can best occur in the absence of added oxygen in the plasma. Since oxygen forms a more stable bond with silicon than the bond between silicon and hydrogen, it can preferentially bond with the reactive silicon and reduce the opportunity for stable Si—H bonds to form. This reaction can also best occur in conditions in which gas flow in the reactor does not sweep away reactive hydrogen species near the polymer surface.

Figure 1:
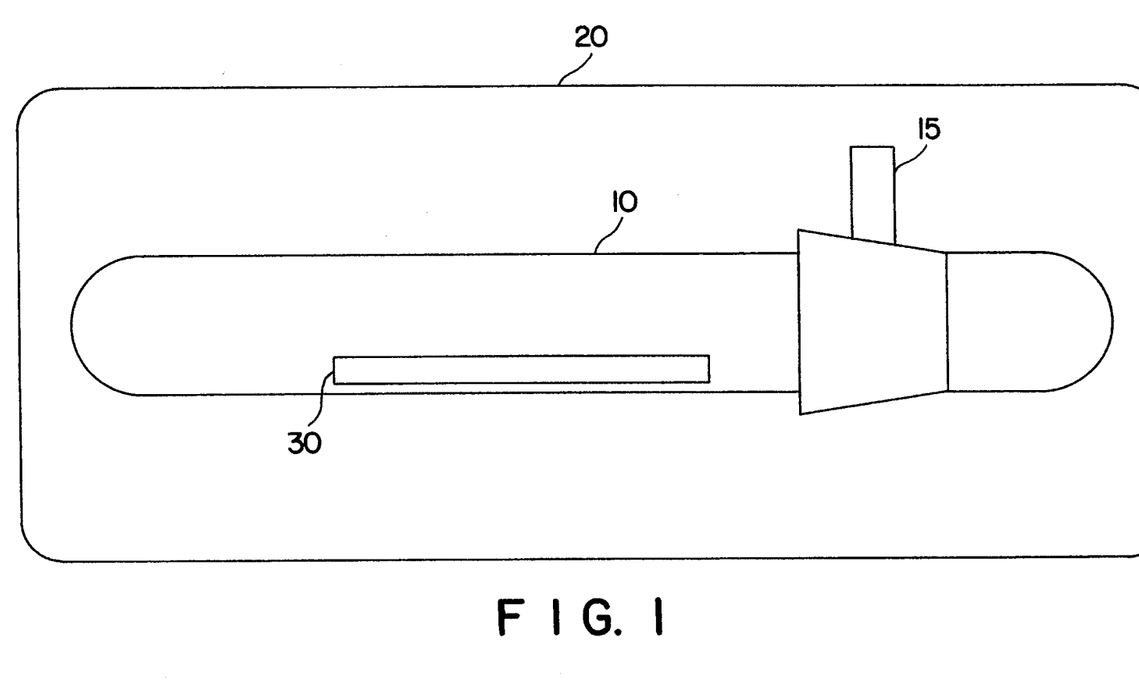
FIG. 1 is a schematic drawing of the microwave chamber and plasma chamber used in the present invention.

A reactor which meets these requirements is shown in FIG. 1. A sealed chamber 10 is constructed of borosilicate glass and is provided with a gas inlet/outlet tube 15. It is constructed in dimensions which allow it to fit into a microwave chamber 20 which can be a standard microwave oven with an output frequency of about 2.45 GHz. The plasma treatment can be undertaken with this equipment by placing a PDMS item to be treated 30 into the chamber 10, followed by initial evacuation to a pressure of about 250-300 mTorr. The pressure is then brought back to atmospheric pressure by introduction of the desired plasma gas. The desired plasma gas can be either hydrogen or a gas which is itself substantially nonreactive with the PDMS substrate such as nitrogen, argon, helium or neon. These evacuation and filling steps may be repeated in order to flush residual moisture and oxygen from the chamber 10. The chamber 10 is then re-evacuated to about 300 mTorr and exposed to microwave radiation to induce the plasma. Exposure times can vary according to the amount of Si—H desired on the material surface but 20 seconds has been found to be satisfactory. In order to avoid the introduction of impurities which may inhibit Si—H formation, the plasma chamber 10 is preferably dismantled and thoroughly cleaned and dried before use. A process which has been found to be satisfactory includes washing the plasma chamber 10 with soap and water, rinsing it with clean water and acetone and heating it in a 120° C. oven for 10-15 minutes.

Figure 2:
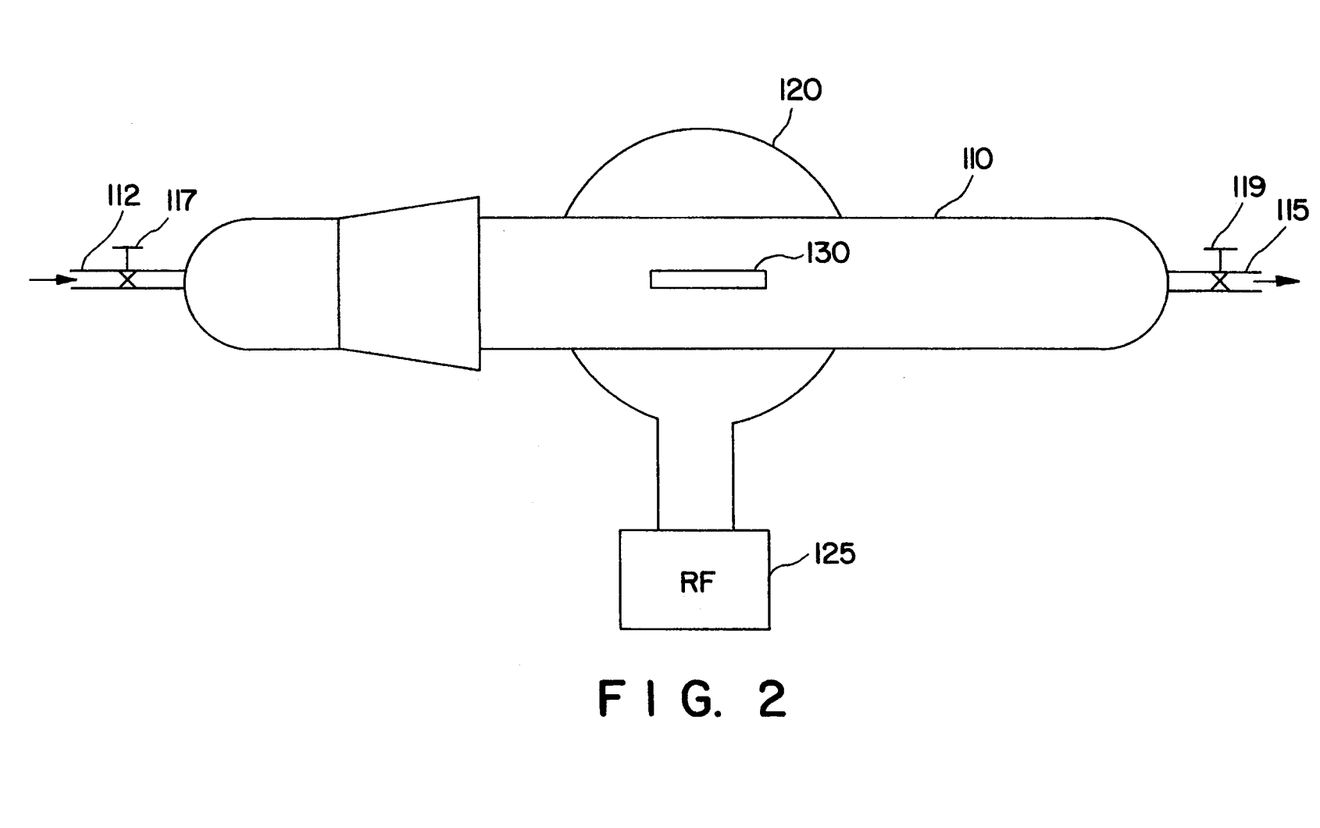
FIG. 2 is a schematic drawing of the radio frequency plasma reactor used in the present invention.

Another reactor which meets the requirements of the present invention is shown in FIG. 2. A sealed chamber 110 is constructed of glass and is provided with a gas inlet tube 112 and an outlet tube 115. The inlet 112 and outlet 115 can be independently controlled by valves 117 and 119. Electrodes 120 are provided and are connected to a source of radio frequency energy 125. The plasma treatment can be undertaken by first removing air and moisture in the chamber 110 by initial evacuation to essentially zero mTorr by closing the inlet valve 117 and applying a vacuum source (not shown) to the outlet 115 with the outlet valve 119 open. The outlet valve 119 is then closed and the desired plasma gas is then bled into the chamber 110 through inlet 112 connected to a gas source (not shown) by opening inlet valve 117 until the pressure in the chamber 110 is about 300 mTorr. The energy source 125 is then turned on to create a plasma in the chamber 110 for a few seconds in order to clean the chamber of foreign material. The gas used can be a gas such as hydrogen, nitrogen, argon, helium or neon. The chamber 110 is then returned to atmospheric pressure and is opened to insert the sample 130. The chamber 110 is again brought down to essentially zero mTorr and is purged by flowing gas through the chamber 110 for a few minutes. The chamber 110 is then brought to 300 mTorr with both inlet and outlet valves 117, 119 closed. The energy source 125 is again turned on to create a plasma in the chamber 110. Exposure times can vary according to the amount of Si—H desired on the material surface but 350 seconds for a 40 watt plasma has been found to be satisfactory.

The resulting material contains at the material surface a large number of reactive Si—H groups which are available for grafting reactions with a variety of chemical species. For example, Si—H can react with silanols in the presence of tin salt catalyst to produce siloxanes:

or reaction with water or alcohols to give silanols or alkoxy silane compounds:

where R is H or a hydrocarbon. Si—H can also undergo hydrosilation with olefins, including vinyl functionalized silicones. Catalysts for the hydrosilation reaction can be a solubilized platinum compound such as chloroplatinic acid. For example:

or for alkynes, an unsaturated silane can be produced:

Free radical initiated hydrosilation could also be accomplished by using a photosensitizer to generate silicone radicals. For example:

and thereby allowing acrylates or methacrylates to be bonded to the silicone radical.

Substances having bioactivity can also be added by first grafting onto the reactive Si—H groups a material with desired pendant groups. For example, heparin, hyaluronic acid and other bioactive substances can be bonded to pendant amine groups as set forth in U.S. Pat. No. 4,613,665 issued to Larm which is incorporated herein by reference. Or, such substances can also be bonded to pendant amine or carboxylic acid groups as set forth in U.S. Pat. No. 5,080,924 issued to Kamel et al.

EXAMPLE 1

1. Substrate preparation. Poly(dimethylsiloxane) (PDMS) films were prepared from a linear vinylmethylsiloxane and dimethylsiloxane copolymer (Mw=28,000, Huls America, Inc.). The reaction between vinyl groups which form the crosslinked network was initiated by the addition of 0.5 weight % t-butyl perbenzoate (Aldrich Chemical) to the linear PDMS. The films containing SiO₂ were prepared by addition of Aerosil 200 brand of $SiO_2$ filler (Degussa Corp.) in amounts ranging from 5 to 20 weight % in 5% increments. For reference purposes, films containing no filler were also prepared. The linear PDMS resin and initiator were first premixed for 24 hours to insure complete dissolution of the initiator. For films containing $SiO_2$ filler, the resin-initiator solution was combined with the $SiO_2$ and mixed for an additional 24 hours in a rolling ball mill. The crosslinking reaction was accomplished by pressure molding the resin mixture for 15 minutes at 149° C. and postcuring for 4 hours at 210° C.

In an effort to remove surface contaminants and residual low molecular weight species before plasma treatment, the postcured PDMS films were placed for three minutes in a bath containing diethyl ether. Diethyl ether was removed from the PDMS substrate by vacuum desiccating the sample for 24 hours.

2. Gas/plasma surface treatments. The plasma chamber that was used is shown in FIG. 1. A sealed chamber 10 was constructed of borosilicate glass and was provided with a gas inlet/outlet tube 15. It was constructed in dimensions which allow it to fit into a microwave chamber 20 which in this case was a standard microwave oven (KMC model KMO-24G microwave oven with an output frequency of 2.45 GHz). The procedure of plasma treatment involved placing a sample 30 with approximate dimensions of 50×25×2 mm into the chamber, followed by initial evacuation to a pressure of about 250–300 mTorr. The pressure was then brought back to atmospheric pressure by introduction of the desired plasma gas; in this case, argon or nitrogen. The chamber was then re-evacuated to about 300 mTorr and exposed to microwave radiation to induce the plasma. Unless otherwise indicated, an exposure time of 20 seconds was used for all samples. In order to avoid the introduction of impurities from preceding tests, the plasma chamber was dismantled and cleaned after every test, including washing the plasma chamber with soap and water, rinsing it with clean water and acetone and heating it in a 120° C. oven for 10–15 minutes.

3. Spectroscopic measurements. Attenuated Total Reflectance Fourier Transform Infrared (ATR-FT-IR) surface spectra were collected on a Digilab FTS-14 equipped with a liquid nitrogen cooled MCT detector. A resolution of 4 $cm^{-1}$ and a mirror speed of 0.3 cm/s were used. The ATR cell (Spectra Tech Inc.) was aligned at a 55° angle of incidence with a 45° end parallelogram KRS-5 crystal. The instrument was continuously purged with purified air (Balston Filter Products). Each spectrum represents 400 coadded scans ratioed against a reference spectrum produced from 400 coadded scans of the empty ATR cell. All spectral manipulations were made using Spectra Calc software (Galactic Industries).

Figure 3:
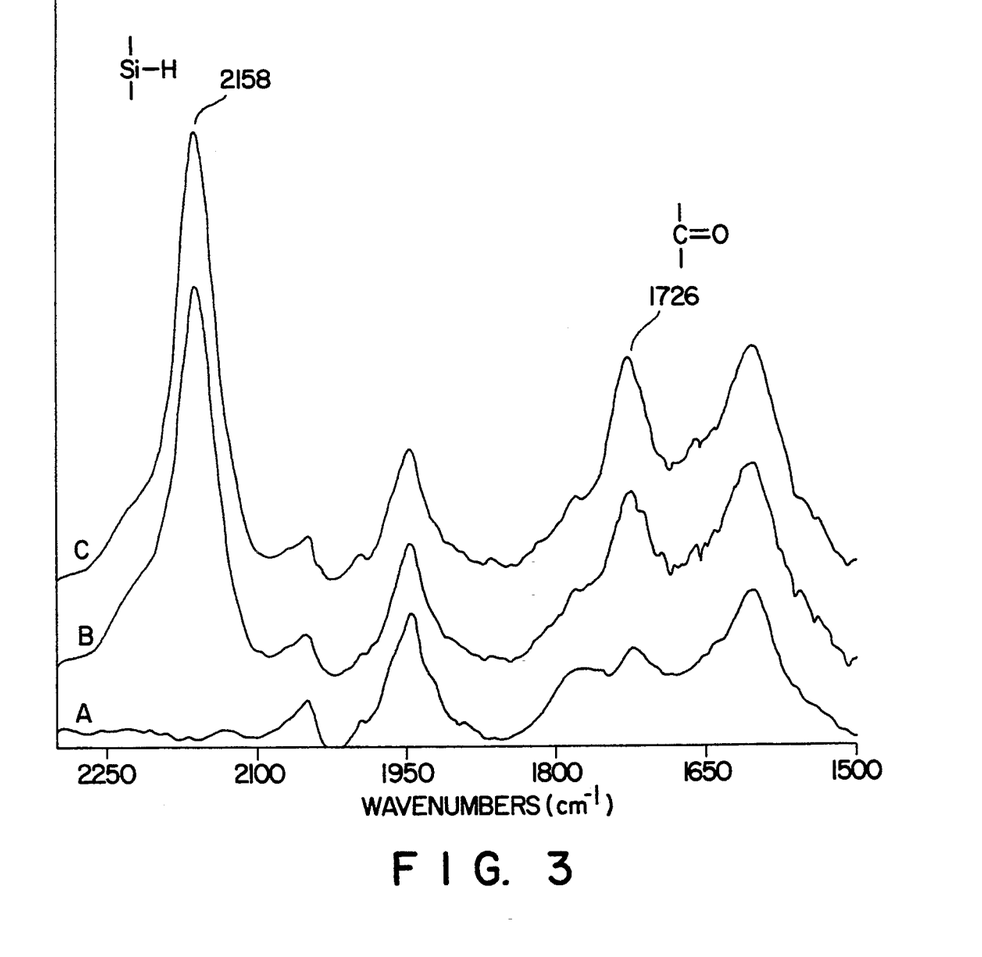
FIG. 3 is an ATR-FT-IR spectra in the range $2300-1500$ cm$^{-1}$ comparing samples made according to the present invention with an untreated control sample.
Figure 4:
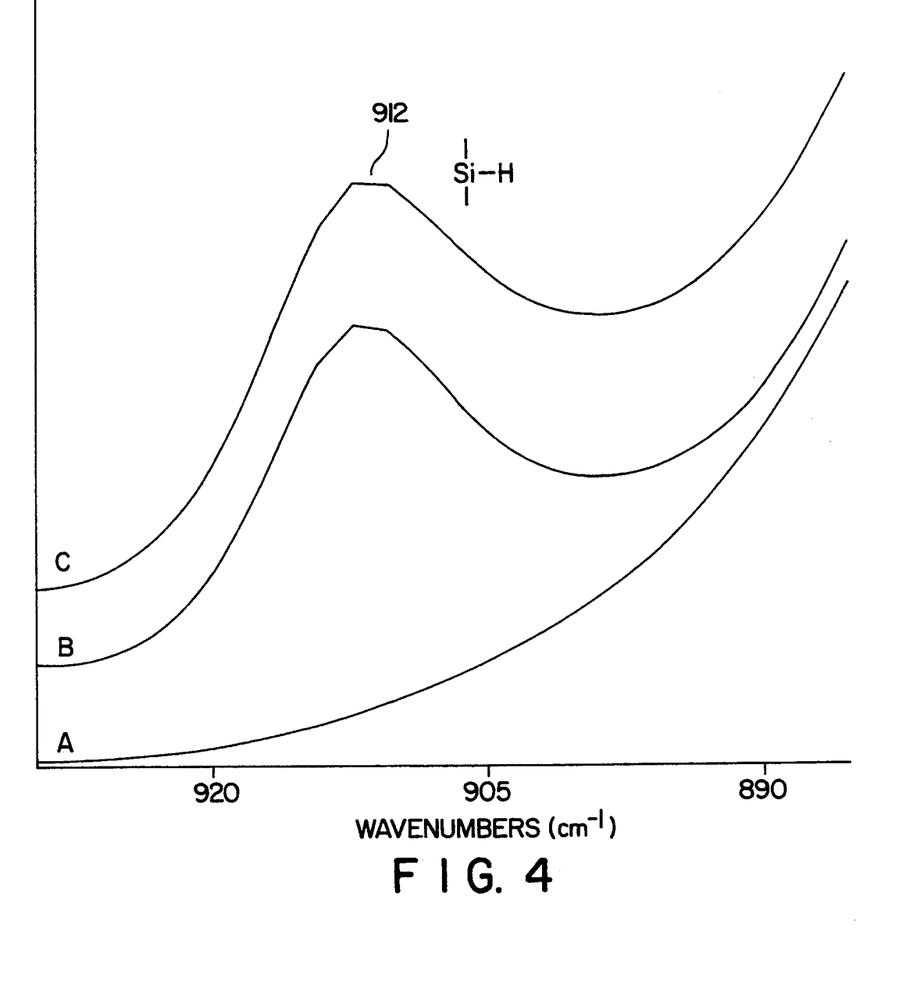
FIG. 4 is an ATR-FT-IR spectra in the range $930-885$ cm$^{-1}$ comparing samples made according to the present invention with an untreated control sample.

4. Results. ATR-FT-IR surface spectra in the 2300–1500 $cm^{-1}$ region of untreated $N_2$/plasma and Ar/plasma treated PDMS samples containing no $SiO_2$ filler are shown in FIG. 3 and corresponding spectra in the 930–885 $cm^{-1}$ region are shown in FIG. 4. The curves marked A are untreated PDMS; the curves marked B are the $N_2$/plasma treated PDMS; and the curves marked C are the Ar/plasma treated PDMS. The striking appearance of two bands at 2158 and 912 $cm^{-1}$ for $N_2$/plasma treated surfaces and for Ar/plasma treated surfaces are indicative of the formation of Si—H chemical species while the band at 1726 $cm^{-1}$ is indicative of carbonyl species formed from surface oxidation.

Figure 5:
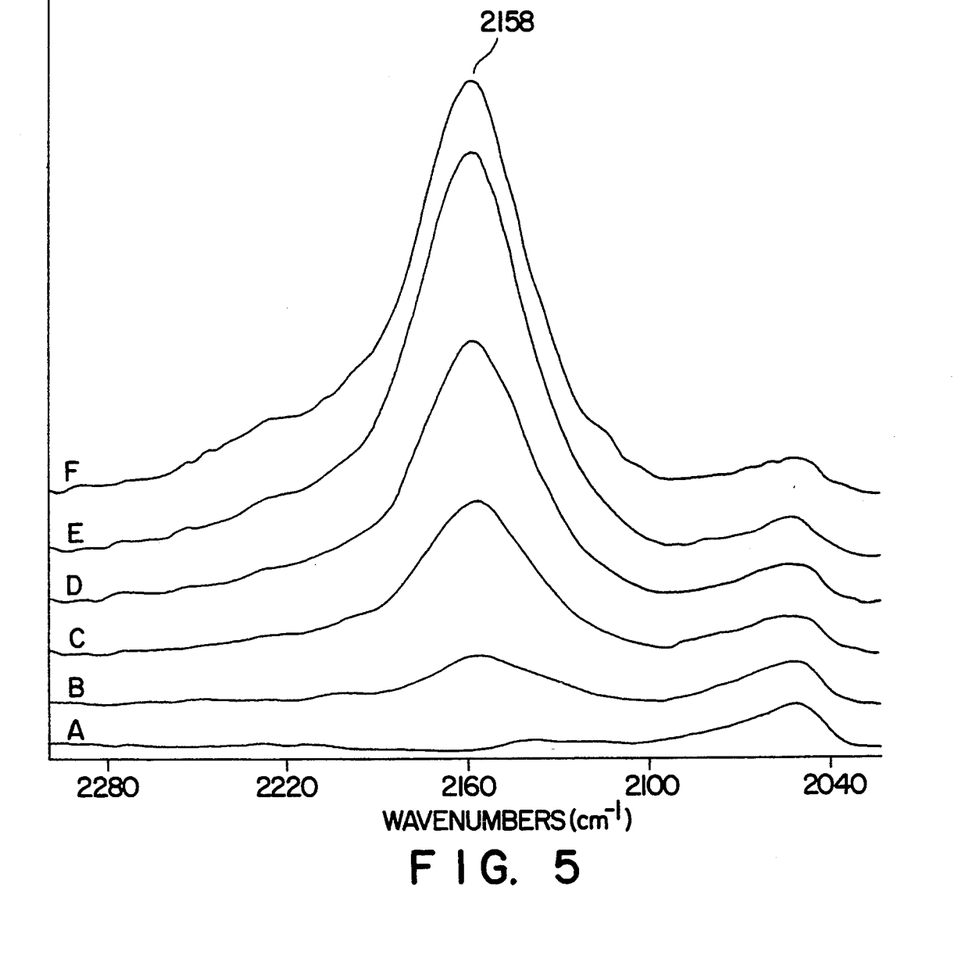
FIG. 5 is an ATR-FT-IR spectra in the range $2300-1500$ cm$^{-1}$ comparing samples made according to the present invention treated according to various plasma exposure times.
Figure 6:
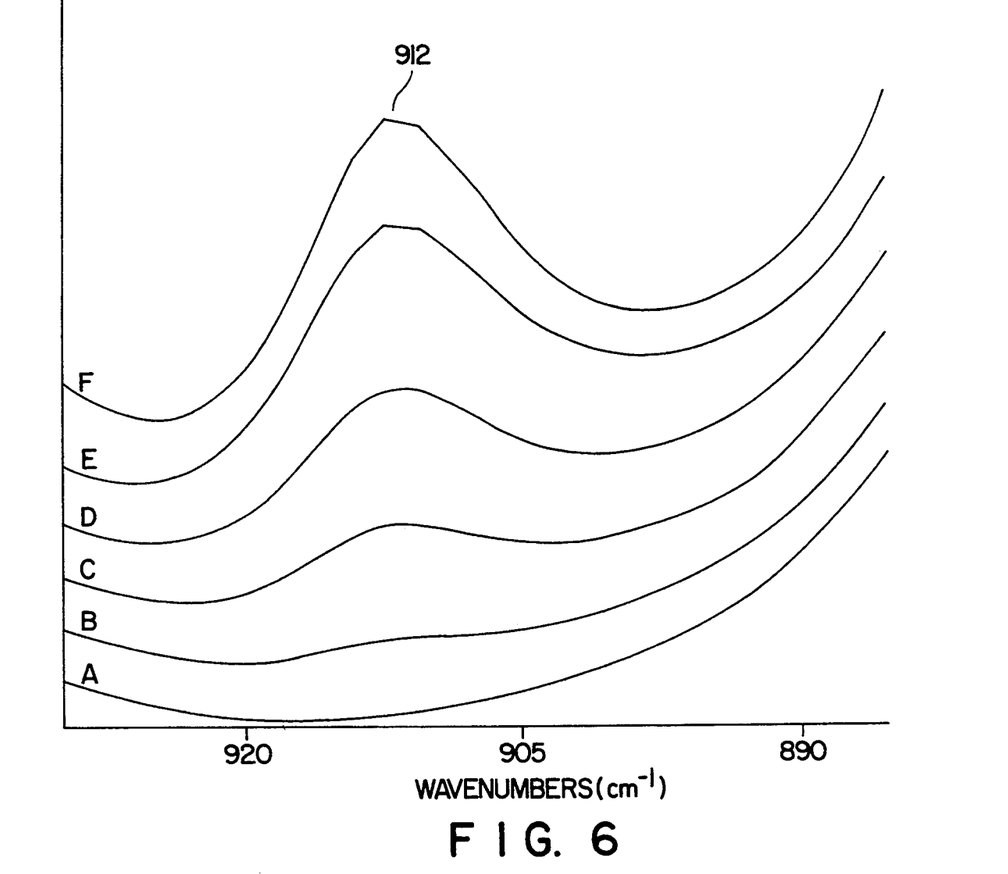
FIG. 6 is an ATR-FT-IR spectra in the range $930-885$ cm$^{-1}$ comparing samples made according to the present invention treated according to various plasma exposure times.

FIGS. 5 and 6 show samples treated with $N_2$/plasma treatment for various exposure times. Curve A is a curve for an untreated sample; curve B is for a sample treated for 5 seconds; curve C is for a sample treated for 10 seconds; curve D is for a sample treated for 15 seconds; curve E is for a sample treated for 20 seconds; and curve F is for a sample treated for 25 seconds. The increasingly prominent bands at 2158 $cm^{-1}$ and 912 $cm^{-1}$ indicate increased formation of Si—H with increased treatment time.

Figure 7:
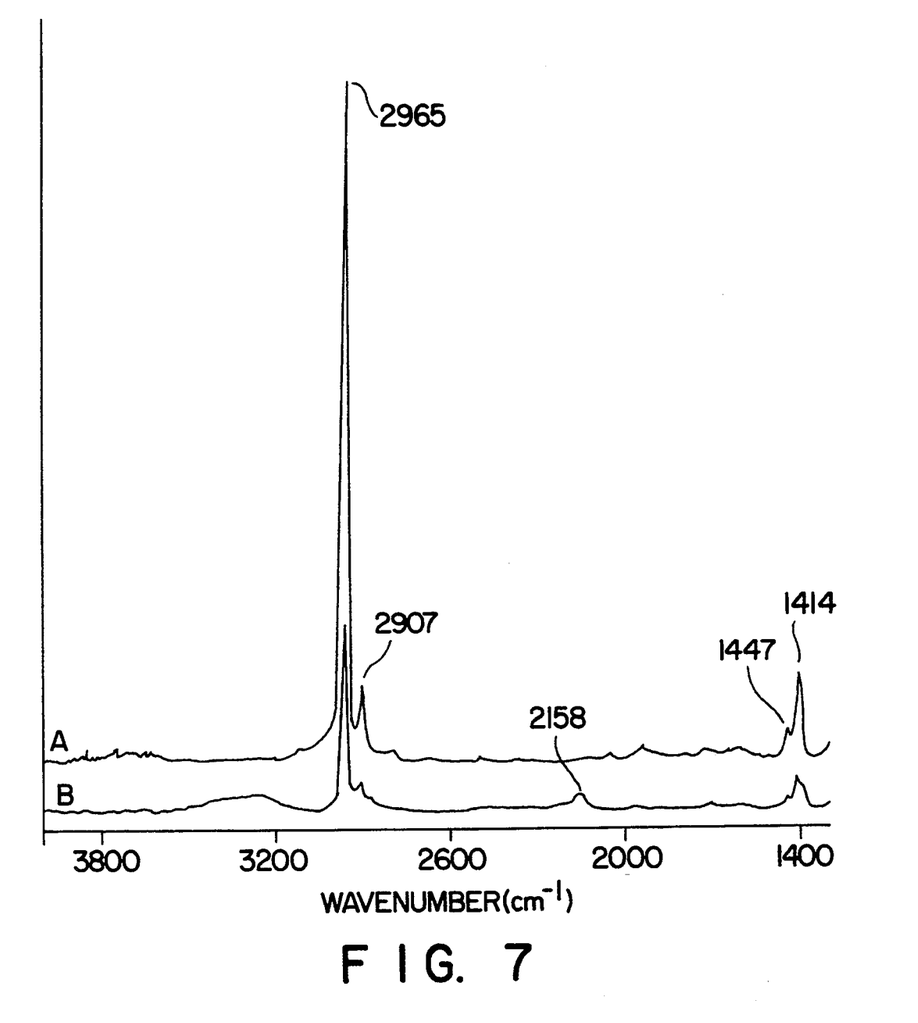
FIG. 7 is an ATR-FT-IR spectra in the range $4000-1300$ cm$^{-1}$ comparing samples made according to the present invention with an untreated control sample, particularly pointing out the bands for methyl groups.

FIG. 7 shows that plasma treated samples according to the present invention (curve B) also provide decreased methyl groups on the PDMS samples when compared with untreated samples (curve A) as evidenced by the reduction in the C—H stretching bands (2965 and 2907 $cm^{-1}$) and C—H bending bands (1447 and 1414 $cm^{-1}$).

EXAMPLE 2

1. Substrate preparation. Poly (dimethylsiloxane) (PDMS) films were prepared from a linear vinylmethylsiloxane and dimethylsiloxane copolymer as set forth in Example 1 Calibration standards were prepared using a linear polydimethylsiloxane polymer (molecular weight 17,250). The PDMS was combined with various amounts of bis(trimethylsiloxy) methylsilane (BTMS) (Huls America Inc.) to obtain solutions containing known Si—H concentrations varying from 0.1 M to 0.32 M. Prior to its use, the mixture was stirred for 15 minutes. Methylhydro-dimethylsiloxane copolymer containing 0.5–1.0% methylhydro units was also obtained from Huls America Inc.

2. Gas/plasma surface treatments. The test samples were treated in the same manner set forth in Example 1.

3. Spectroscopic measurements. ATR-FT-IR surface spectra were collected as set forth in Example 1. In addition, in order to quantify the amount of Si—H functional groups, a Kramers-Kronig (KK) transformation along with Fresnel's equations were utilized, allowing the construction of calibration curves independent of the sample refractive index, crystal coverage and the angle of incidence.

Figure 8:
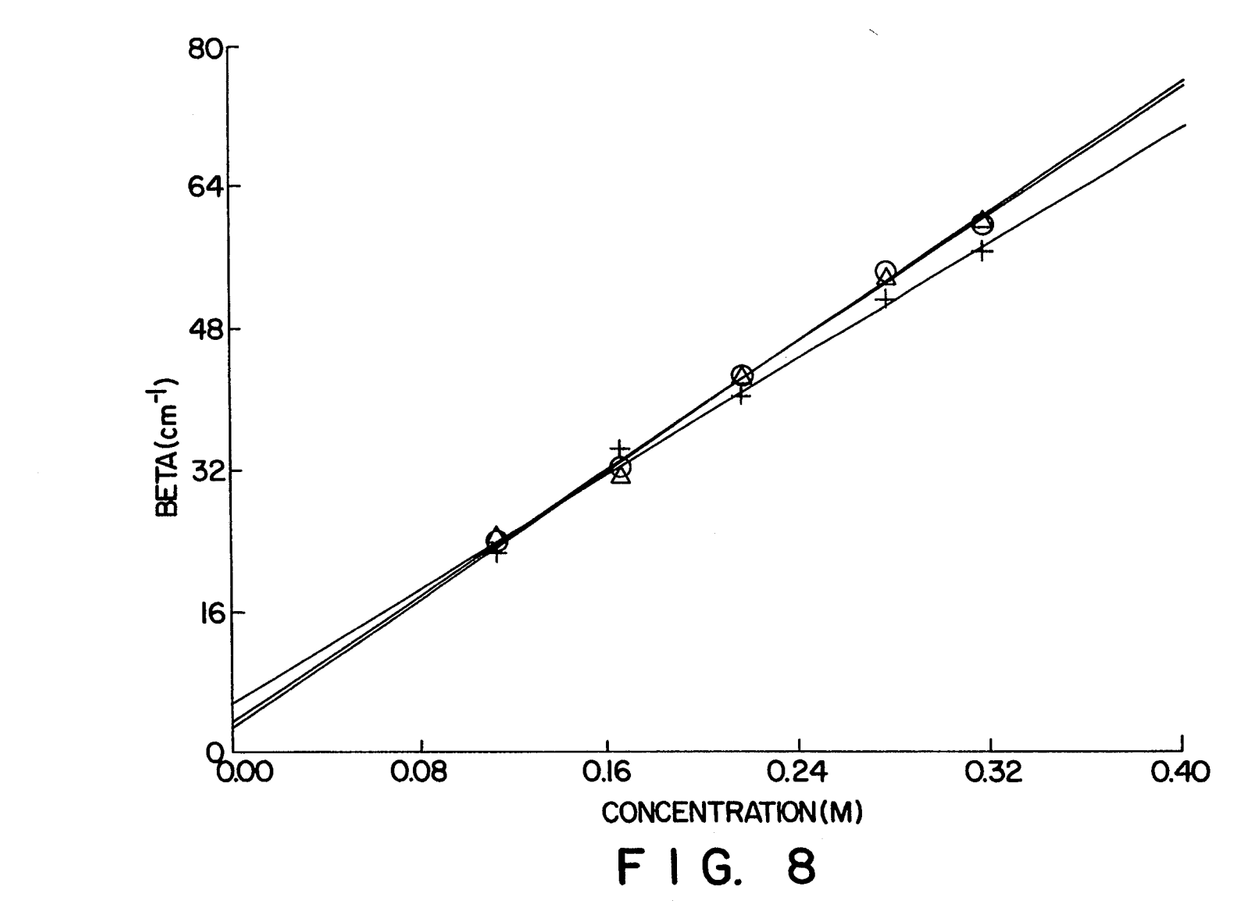
FIG. 8 is a calibration curve constructed from ATR spectra for various standard Si—H solutions by plotting Si—H peak intensity as a function of concentration.

4. Results. The calibration curve of FIG. 8 was constructed from ATR spectra of the various BTMS solutions by plotting Si—H peak intensity as a function of concentration and employing KK transformation on the spectra. The linear correlation coefficient was greater than 0.996. To test the accuracy of the calibration curve, ATR-FT-IR spectra of Methylhydro-dimethylsiloxane copolymer were collected and compared with calculated concentrations of Si—H species with good agreement (a degree of accuracy with a maximum deviation of 0.01 M). Plasma treated samples made according to the present invention were then tested with the results set forth in Table 1.

TABLE I

| Effective Angle (°) | β | Depth of Penetration (μ) | Calculated Si—H Concentration (M) |
|---|---|---|---|
| 45.00 | 31.04 | 0.807 | 0.12 |
| 47.10 | 31.76 | 0.719 | 0.12 |
| 49.28 | 35.24 | 0.657 | 0.14 |
| 51.24 | 37.36 | 0.657 | 0.16 |

EXAMPLE 3

Figure 9:
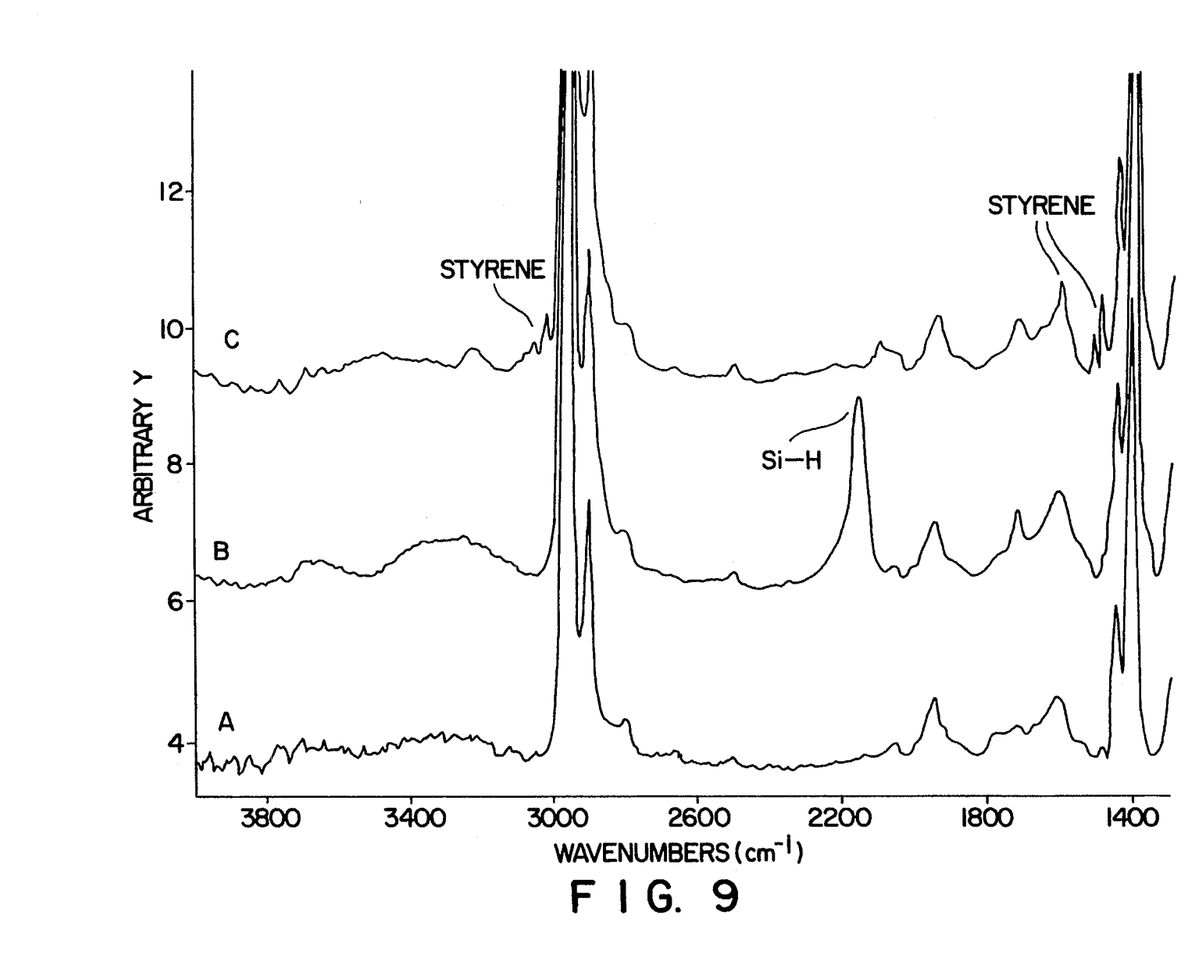
FIG. 9 is an ATR-FT-IR spectra in the range $4000-1300$ cm$^{-1}$ comparing samples made according to the present invention which have been grafted with styrene with samples not treated with styrene and an untreated control sample, particularly pointing out the bands for styrene.

A styrene grafting solution was made by dissolving 1.2 M styrene dried by distillation, 0.0005 M chloroplatanic acid, and 0.002 M hydroquinone in chloroform. Ar/Plasma treated test samples made according to Example 1 were then immersed in this solution for 72 hours at room temperatures removed and dried. ATR-FT-IR spectra of the resulting product (curve C) is shown in FIG. 9 in comparison with spectra for untreated test samples (curve A) and plasma treated test samples (curve B).

It will be appreciated by those skilled in the art that while the invention has been described above in connection with particular embodiments and examples, the invention is not necessarily so limited and that numerous other embodiments, examples, uses, modifications and departures from the embodiments, examples and uses may be made without departing from the inventive concepts.

We claim:

1. A method for modifying the surface of a polydimethylsiloxane silicone rubber comprising the step of: treating the silicone rubber in a plasma which is substantially free of oxygen and under conditions which do not strip reactive hydrogen groups from the silicone rubber surface to produce Si—H moieties on the surface thereof.

2. The method of claim 1 also comprising the step of grafting to the treated silicone rubber.

3. The method of claim 1 wherein the plasma is a microwave-induced plasma.

4. The method of claim 3 wherein the plasma is generated at a frequency of about 2.45 GHz.

5. The method of claim 1 wherein the plasma is a radio frequency induced plasma.

6. The method of claim 5 wherein the plasma is generated at a frequency of about 13.56 MHz.

7. The method of claim 1 wherein the plasma is generated at about 300 mTorr

8. The method of claim 1 wherein the plasma treatment takes place in the presence of a gas selected from the group consisting of hydrogen, nitrogen, helium, argon, neon and mixtures thereof.

9. A method for modifying the surface of a polydimethylsiloxane silicone rubber comprising the step of: treating the silicone rubber with a plasma in the presence of a gas selected from the group consisting of hydrogen, nitrogen, helium, neon and argon, said plasma in a chamber which is substantially free of oxygen and oxygen-producing compounds and under conditions which limits gas flow in the chamber to that which does not strip reactive hydrogen groups from the silicone rubber surface, whereby Si—N is produced on the surface.

10. The method of claim 9 wherein the plasma is generated at about 300 mTorr.

11. The method of claim 9 also comprising the step of grafting to the treated silicone rubber.

12. The method of claim 11 wherein the Si—H is reacted with a silanol in the presence of a catalyst to produce a siloxane.

13. The method of claim 11 wherein the Si—H is reacted with an alcohol in the presence of a catalyst to produce an alkoxy silane.

14. The method of claim 11 wherein the Si—H is reacted with an olefin in the presence of a catalyst to produce a saturated silane.

15. The method of claim 11 wherein the Si—H is reacted with an alkyne in the presence of a catalyst to produce an unsaturated silane.

16. The method of claim 11 wherein the Si—H is reacted with a photosensitizer to generate silicone radicals.

17. The method of claim 9 wherein the plasma is a microwave-induced plasma.

18. The method of claim 17 wherein the plasma is generated at a frequency of about 2.45 GHz.

19. The method of claim 9 wherein the plasma is a radio frequency induced plasma.

20. The method of claim 19 wherein the plasma is generated at a frequency of about 13.56 MHz.

* * * * *